(12) United States Patent
Lin

(10) Patent No.: US 7,906,246 B2
(45) Date of Patent: Mar. 15, 2011

(54) POWDERED FUEL CELL

(76) Inventor: I-Chuan Lin, Yuemei Village (TW)

( * ) Notice: Subject to any disclaimer, the term of this patent is extended or adjusted under 35 U.S.C. 154(b) by 1147 days.

(21) Appl. No.: 11/563,009

(22) Filed: Nov. 23, 2006

(65) Prior Publication Data

US 2008/0124607 A1 May 29, 2008

(51) Int. Cl.
*H01M 8/22* (2006.01)
*H01M 4/02* (2006.01)
*H01M 8/24* (2006.01)
*H01M 2/02* (2006.01)

(52) U.S. Cl. .......... 429/503; 429/529; 429/462; 429/463

(58) Field of Classification Search .................. 429/503, 429/529, 462, 463
See application file for complete search history.

(56) References Cited

U.S. PATENT DOCUMENTS

| 3,592,698 A * | 7/1971 | Baba .............................. 429/406 |
| 3,758,342 A * | 9/1973 | Baba .............................. 429/404 |
| 2005/0255339 A1 * | 11/2005 | Tsai et al. ....................... 429/12 |

* cited by examiner

*Primary Examiner* — Helen O Conley
(74) *Attorney, Agent, or Firm* — Chun-Ming Shih

(57) ABSTRACT

A powdered fuel cell includes current collectors, fuel chambers, porous membranes, electrolyte chambers and gas diffusion electrodes. The porous membranes pass oxide the formed from the reacted fuel through the holes thereof and block the unreacted powdered fuel; the electrolyte chambers provide the storage space for electrolyte so as to conduct ions and provide the collection space for the reacted oxide; and the gas diffusion electrodes, each has one side surface thereof for an oxidizing agent incoming and outgoing and catalyzed to acquire electron and ion conduction, wherein one of the current collectors and one of the gas diffusion electrodes are connected by posts, saving outer wires and being connected directly to the anode and the cathode as a loop. Thus, a power supply being capable of electricity conversion and storage and movable is realized.

15 Claims, 16 Drawing Sheets

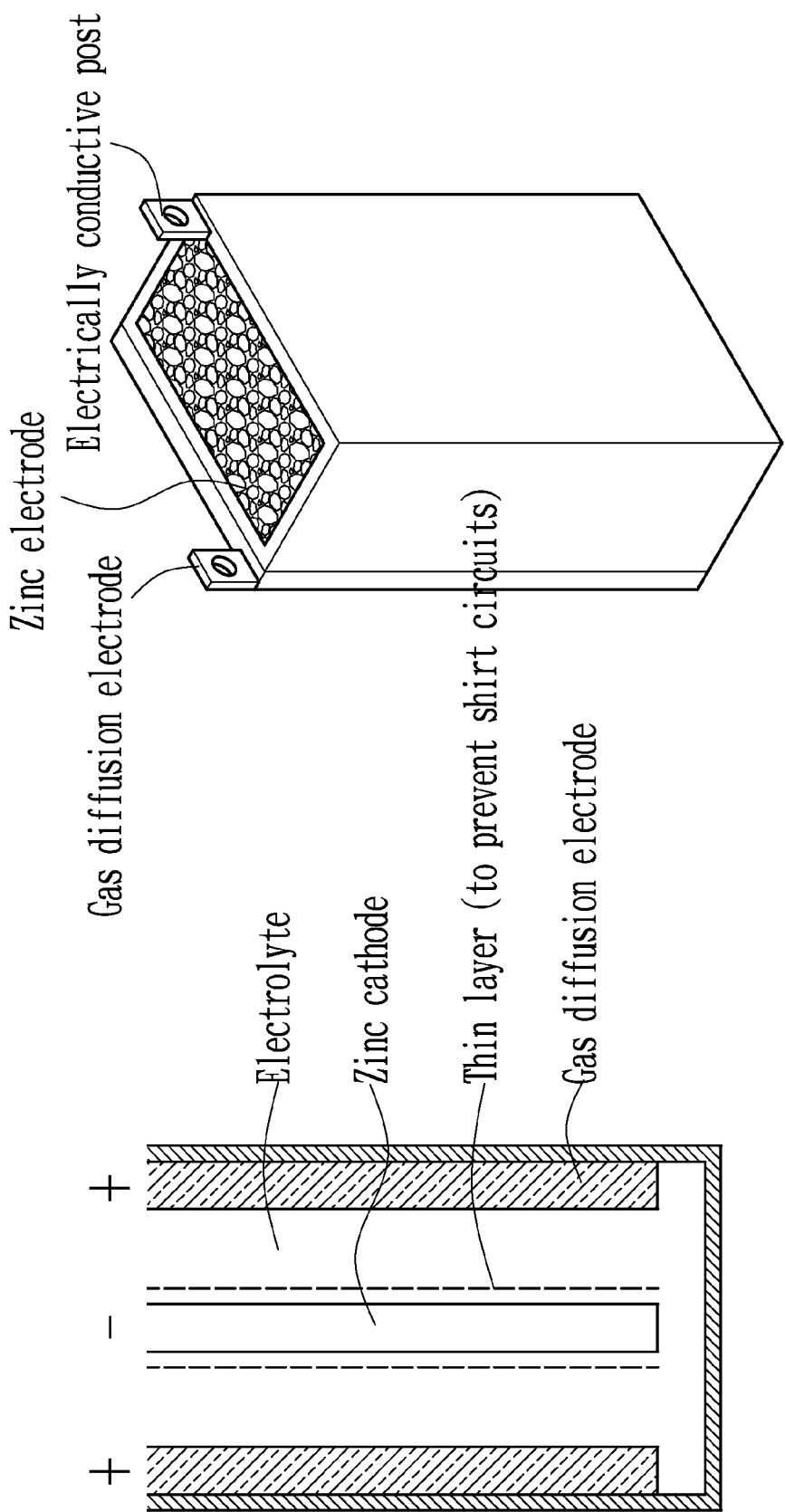

POWDERED FUEL CELL

BACKGROUND OF THE INVENTION

1. Field of the Invention

The present invention relates to a powdered fuel cell and, in particular, to a powdered fuel cell having low cost, high energy density, high efficiency and the capability for reducing weight and energy use.

2. Descriptions of the Prior Art

The capability of the cell for converting chemical energy to electrical energy and conversely has been well known. However, in manufacturing of cells for many applications, e.g., electric vehicle, certain factors need be taken into consideration such as high energy density, high energy conversion efficiency, low cost, long life cycle, safety, convenience and low effect on the environment. In general, the compositional weight and volume of the typical cell would be increased due to those factors. Therefore, it is very difficult to construct an operationable, safe and convenient commercialized practical cell.

The fuel cell is an electrochemical apparatus, wherein a portion of the energy from the chemical reaction is converted to direct-current electrical energy directly. The direct conversion of energy to direct-current electrical energy dispels the demand for conversion of energy to heat and, therefore, avoids resulting in the limitation set by the effect of the Carnot cycle. In absence of effect of the Carnot cycle, theoretically the fuel cell has an efficiency higher than the traditional energy generating apparatus (e.g., internal combustion engine) by 2 to 3 times.

Fuel cell are classified according to the fuel:

(a) Gas fuel cell (hydrogen, carbon monoxide, gas hydrocarbon);

(b) Liquid fuel cell (alcohol, aldehyde, bydhazine, hydrocarbon, chemical compound);

(c) Solid fuel cell (coal, charcoal, coke, metal flake).

Because of the energy shortage and the green house effect in recent years, and by the demand for the high performance of clean energy or urgently for independent power source for transport and electricity load, research on new electrochemical batteries has been pushed through significantly. Typical fuel cells utilize a polymeric membrane for the ions of electrolytes, which is conventionally the polymeric proton exchange membrane (PEM), as an electrolyte ion exchange membrane. Ion membrane is placed between anode and cathode, which are gas diffusion electrodes exposed to the respective reducing agent and oxidizing agent gas for the reaction thereof.

Thus, when electrochemical reaction occurs, each contact between those two contacts (three-phase interfaces) is an interface between the electrolyte polymer and the reactant gas for the electrodes. For example, when the oxidizing agent gas is oxygen and the reducing agent gas is hydrogen, hydrogen is supplied to the anode and oxygen is supplied to cathode.

The overall chemical reaction is $2H_2+O_2 \rightarrow 2H_2O$, for which the electrochemical reactions occurring at a precious metal catalyst are shown as follows:

Reaction at anode: $2H_2 \rightarrow 4H^+ + 4e^-$ $E^{1/2}=0.828V$;

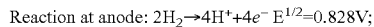
Reaction at cathode: $O_2+4H^++4e^- \rightarrow 2H_2O$
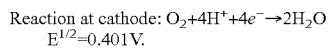
$E^{1/2}=0.401V$.

This relates to the well-known hydrogen fuel cell available commercially. The technology is mature, whereas it cannot replace current internal combustion engines for the following disadvantages:

1. High cost: high-price ion membrane is needed for use; high-price precious metals, e.g., platinum or ruthenium, are needed for the electrode catalysts.

2. Low energy density: theoretically one kilogram of hydrogen storage material has hydrogen content of about 1.5% by weight, as being expensive; the energy density is even lower when hyperbaric hydrogen or liquid hydrogen is used alternatively.

3. Safety: it is very dangerous since hydrogen burns fast and is flammable and explosible.

4. Low efficiency of energy resource: it has efficiency of 30-60% only.

5. Convenience: Appropriate thermal management is necessary during the processes of storage of and release of hydrogen, no matter that hyperbaric hydrogen, liquid hydrogen or metal hydrogen storage material is used and, therefore, it is inferior to gasoline having advantages such as fastness, convenience and replenishment depending on the amount used.

The five aspects described above are the most difficult in practicing the fuel cell. Moreover, it is difficult to make high-purity hydrogen (impure hydrogen would poison the electrodes) so that the price of hydrogen is many times higher that that of gasoline.

In order to mend such problems, scientists have proposed such a chemical compound as sodium borohyride for liquid fuel cell, wherein sodium borohyride has reaction:

Reaction at anode: $BH_4^- + 8OH^- \rightarrow BO_2^- + 6H_2O + 8e^-$
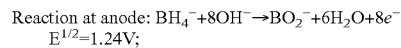
$E^{1/2}=1.24V$;

Reaction at cathode: $2O_2 + 4H_2O + 8e^- \rightarrow 8OH^-$
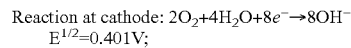
$E^{1/2}=0.401V$;

Overall chemical reaction: $BH_4^- + 2O_2 \rightarrow BO_2^- + 2H_2O$
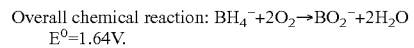
$E^0=1.64V$.

This compound, which is soluble in strong base at the positive electrode and in strong acid at the negative electrode, may settle the problem of storage and energy density, but it is associated with incomplete consumption of energy with 10-20% residual that cannot convert, like ordinary batteries. Since the compound tends to be affected by the air and then oxidized and contaminated to release hydrogen, expensive ion membrane (e.g., PEM) and noble metals should be employed to prevent self-discharge. In the aspect of safety, during the replenishment of fuel the compound may leak out and contaminate the environment or may damage the users due to the strong acid or base replenished, which would be dangerous if leaking out. Technology for the compound in this aspect has not yet matured.

Additionally, a metal-air fuel cell has been proposed that electrochemically couples a reactive metal electrode to an air electrode through a suitable electrolyte. As well known in the art, the electrolyte may be typical caustic liquid or sodium chloride, which is ionically conductive but not electrically conductive. Therefore, the air cathode is formed into a flake shape and has opposite surfaces respectively exposed to an electrolyte of the cell and the atmosphere, wherein the oxygen in the atmosphere may decompose (during the action of the cell) and the metal of the anode may undergo oxidization so that an appropriate current is provided through the outer circuit connecting the anode to the cathode and thereby the electrically conductive devices used in the outer circuit are combined certainly.

The zinc metal-air fuel cell has equations thereof as follows:

Electric reaction at cathode: $\frac{1}{2}O_2 + H_2O + 2e^- \rightarrow 2OH^-$
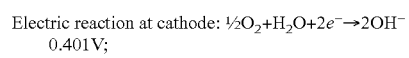
$0.401V$;

Electric reaction at anode: $Zn+2OH^- \rightarrow ZnO+H_2O+2e^-$ 1.245V;

Theoretical generation of electricity: $\frac{1}{2}O_2+Zn \rightarrow ZnO$ 1.645V.

The actual open-circuit voltage is about 1.5 V. The metal material that can be used to be oxidized includes zinc, iron, magnesium, calcium, tin, aluminum, lithium or alloys thereof, and it can be present as metal or the oxide thereof.

The currently employed commercial metal-air cells have huge volume and low energy density, require replacing the whole cell or charging to replenish with electricity, and consume energy incompletely with 10-20% residual unoxidized, so that the electricity would be wasted and the efficiency influenced very inconveniently. Moreover, metal-air cells have another handicap with respect to air (catalyst) and heat management and to the associated intrinsic volume expansion of the metal. For example, the zinc electrode expands when the metal zinc oxidizes to become zinc oxide and zinc hydroxide with a resultant change of volume since zinc powder has a specific weight of 7.14 while zinc oxide has a specific weight of 5.06; due to the difference in specific weights, the volume of zinc powder would expand after oxidization and such change of volume would result in an overflow of the electrolyte and a bend of the anode. Metal-air cells have yet another handicap with respect to cell failing caused by deteriorated anodes that leads to uneven discharge and thereby decreases the power output. Thus, it is very hard to replace gasoline with metal-air cells though they are inexpensive.

FIGS. 1 and 2 show a conventional metal flake fuel cell and a conventional pellet fuel cell, respectively, which would suffer such problems after assembling in series as wind flow management, heat management, expansion of metal, and overflow and leakage of electrolyte and have derived numerous patents in association, e.g., U.S. patent application Ser. Nos. 60/340,592, 60/380,048, 60/387,355, 60/285,850, 60/384,547, 60/384,550, 60/391,860, 60/340,592, 60/389,821, 60/386,121, 60/326,432, 60/346,128, 09/805,419, 09/621,836, 09/893,163, 60/288,675, 60/292,237, 09/258,573, 09/584,875, 60/301,558, 60/312,659, 09/695,698, 09/695,699, 60/290,945, 60/286,199, 09/594,649, 09/414,874, 60/275,786, 09/695,697, 60/358,229, 60/274,337, 09/827,982, 60/344,546, 60/324,867, 60/340,697, 60/298,537, 60/295,634, 60/267,819, 60/286,198, 60/263,174, 60/270,952, 60/267,933, 60/261,126, all mentioning the foregoing problems. The present invention may settle all these problems rather practically.

SUMMARY OF THE INVENTION

The primary objective of the present invention is to provide a powdered fuel cell that may settle such problems as wind flow management, heat management, expansion of metal, and overflow and leakage of electrolyte.

Another objective of the present invention is to provide a powdered fuel cell that may use powdered fuel for directly replenishing a fuel chamber of the fuel cell, wherein the powdered fuel, mixed with an electrolyte, contacts a current collector of the fuel cell to provide electricity and a metal oxide, dissolved in the electrolyte, may be recycled for use.

Yet a further objective of the present invention is to provide a powdered fuel cell that achieves simpler operation, action simply at normal temperature and atmosphere, high energy density, high efficiency, low cost, durability, convenience, highly environmental protection, ready maintenance and simple conversion and storage of electricity, and having movable power supply and perpetual independent power supply.

A powdered fuel cell for fulfilling the above objectives of the present invention comprises:

current collectors, made of conducting material for collecting conducting electrons;

fuel chambers, each providing a storage space for powdered fuel to carry out oxidization reaction;

porous membranes, for passing the oxide formed from the reacted fuel therethrough and blocking the unreacted fuel, the porous membranes 3 each having a plurality of holes for passing the oxide therethrough to the electrolyte chamber described below;

electrolyte chambers, each providing a storage space for the electrolyte so as to conduct ions and each providing a collection space for the reacted oxide; and gas diffusion electrodes, each having at least one side surface thereof for an oxidizing agent incoming and outgoing and catalyzed to acquire electron and ion conduction.

BRIEF DESCRIPTION OF THE DRAWINGS

The drawings disclose illustrative embodiments of the present invention, which serves to exemplify the various advantages and objectives hereof, and are as follows:

FIG. 1 is an assembly schematic diagram of a conventional metal flake fuel cell;

FIG. 2 is a schematic diagram of a conventional pellet fuel cell;

DESCRIPTION OF THE PREFERRED EMBODIMENT

Figure 3:
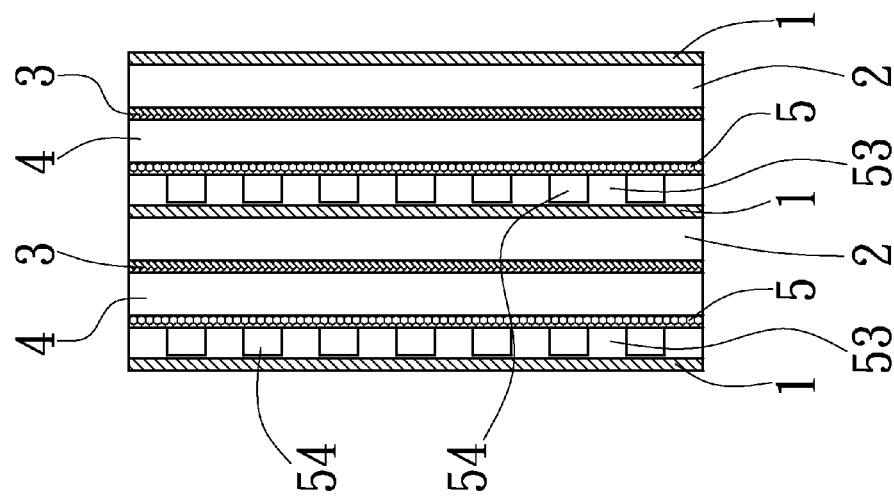
FIG. 3 is a combination schematic diagram of a powdered fuel cell of the present invention.

Refer to FIG. 3, which shows a combination top view of a powdered fuel cell provided in the present invention, comprising: current collectors 1, made of conducting material for collecting conducting electrons; fuel chambers 2, each providing a storage space for powdered fuel A to carry out oxidization reaction; porous membranes 3, for passing oxide B formed from the reacted fuel therethrough and blocking the unreacted powdered fuel A, the porous membranes 3 each having a plurality of holes for passing the oxide B therethrough to the electrolyte chambers 4 described below; electrolyte chambers 4, each providing a storage space for electrolyte C so as to conduct ions and each providing a collection space for the reacted oxide B; and gas diffusion electrodes 5, each having at least one side surface thereof for an oxidizing agent incoming and outgoing and catalyzed to acquire electron and ion conduction.

Figure 4:
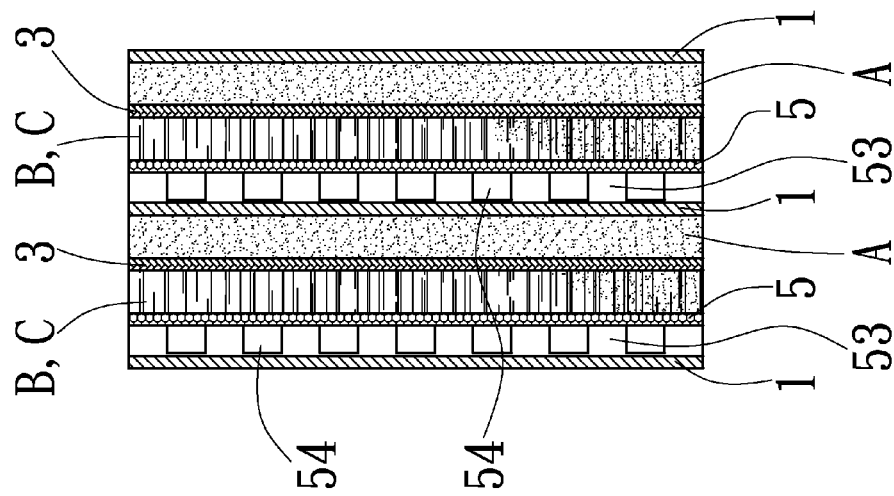
FIG. 4 is a top view of the powdered fuel cell of the present invention with the storage of powdered fuel and electrolyte.
Figure 5:
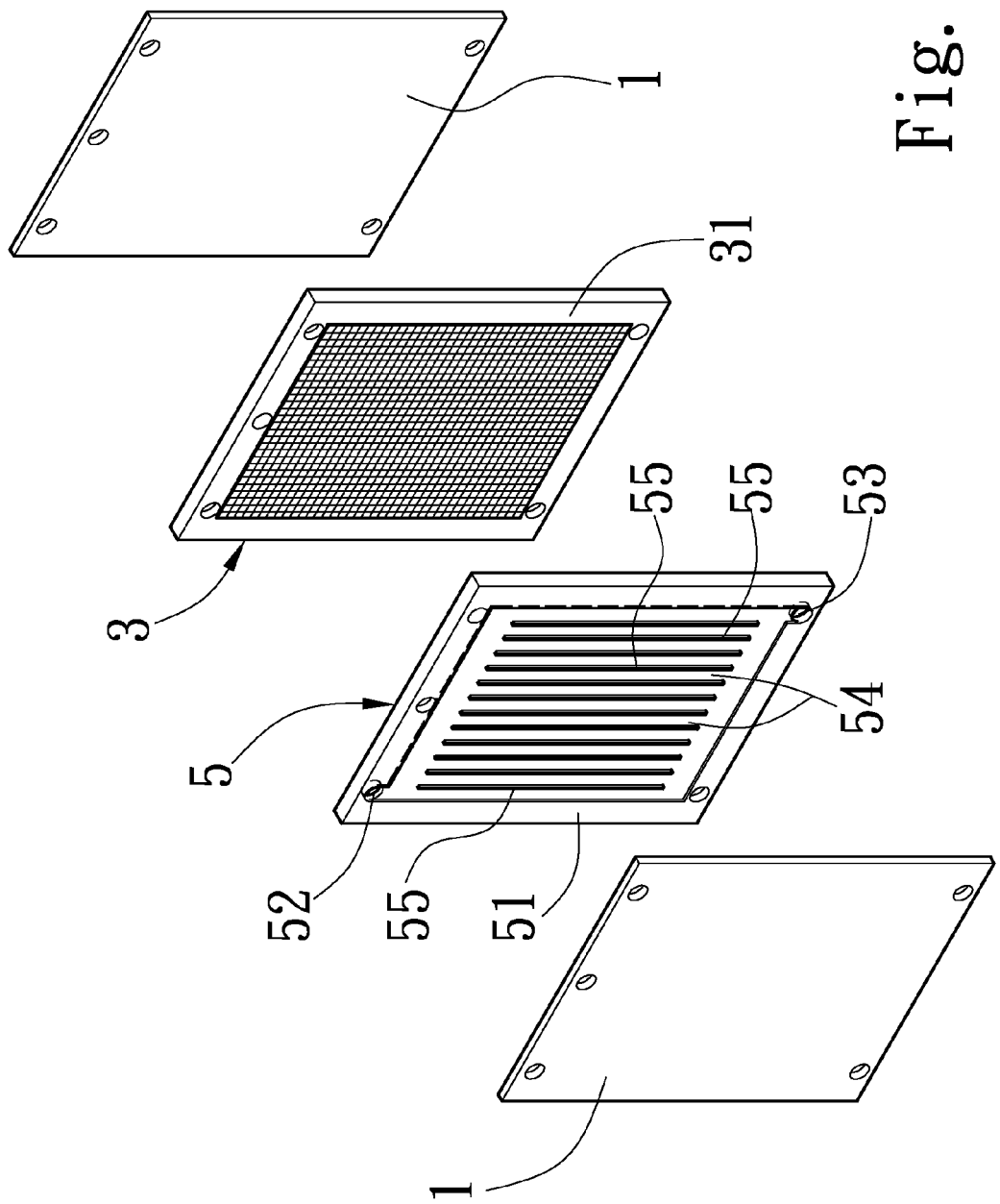
FIG. 5 is an exploded schematic diagram of the powdered fuel cell of the present invention.
Figure 6:
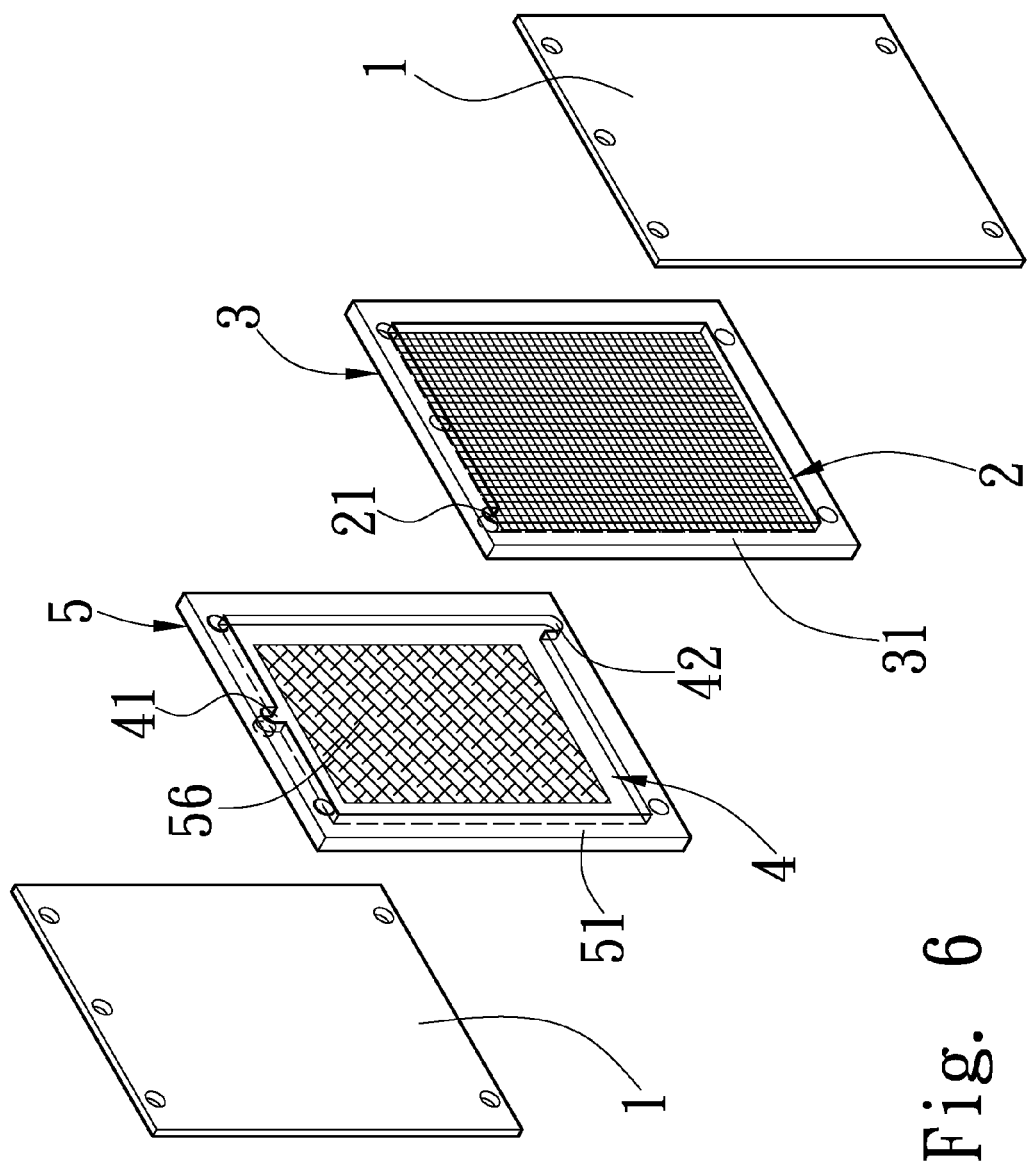
FIG. 6 is an exploded schematic diagram viewed from the other side of the powdered fuel cell of the present invention.

Refer to FIG. 4 to 6 for a further detailed description of the present invention. The current collectors 1 is formed of a material plate and made of conducting material for collecting conducting electrons, the conducting material including copper, iron (II), stainless steel, nickel, carbon, conductive polymer (conductive rubber), graphite, glass and metal but not limited to these. Those skilled in the art may decide to use other material that is useful.

The fuel chambers 2 each provide a storage space for the powdered fuel A to carry out oxidization reaction, the fuel chambers 2 each being formed with a first frame body of insulating material with the top end portion or one end surface thereof constructed for allowing the powdered fuel A to pass, the fuel chambers 2 each having at least one communicating opening 21 disposed at the top end or one end surface thereof, and the first frame bodies for forming the fuel chambers 2 being made of a hard body or an elastic body of flexible material sealed by means of ultrasonic welding, laser welding, adhesive coating or compressing so as to avoid leakage of the electrolyte C. Those skilled in the art may realize but not be limited to this technique.

The porous membranes 3 each have a plurality of holes formed for passing the oxide B formed from the reacted fuel therethrough and for blocking the unreacted powdered fuel A, the holes having diameters of preferably but not limited to 3-200 μm, depending on the particle size of the powdered fuel A (the typical metal particle size is more than 3-5 μm), the holes also being machinable to have diameters more than 5 μm, the oxide B having powder particle size less than μ0.8 m once the powdered fuel A reacted and oxidized, and thus the oxide B being able to pass the holes with the electrolyte C flowing through or vibrating the porous membranes 3 while the powdered fuel A being blocked by the porous membranes 3, so that the powdered fuel A may be renewed via the top end openings 21 of the fuel chambers 2 for continuously discharging. The powdered fuel A of the present invention has the product, nanometer-scale oxide B, which tends to be dissolved in the electrolyte C to pass the porous membranes 3 and may be drained out with the electrolyte C. Next, the powdered fuel A may be renewed so that not only discharge may be continued with no residual of fuel but also volume expansion cannot occur along with the production of the oxide B, which otherwise would lead to an uneven space between the anode and the cathode causing reduced efficiency or overflowing electrolyte C and damaged cell structure. Wherein, the porous membranes 3 may be made singly of woven mesh, punched-hole mesh, expanded metal mesh or porous ceramics, or may be coated with an adhesive and fixed over a first frame 31 formed of an insulating hard body such as plastic, mineral ceramic, or, alternatively, it may be cast molded with the first frame 31 or one-piece compression/injection molded with the first frame 31, and those skilled in the art may realize but not be limited to this technique; the porous membranes 3 of the present invention may have increased strength in a large-scale member by adopting two layers of different material with holes, of which one is that having hole diameters of 3-200 μm described above and another is one having large hole diameters more than 200 μm, and the hole size may be adopted to be, but not limited to, what those skilled in the art can decide.

The electrolyte chambers 4 each provide a storage space for the electrolyte C so as to conduct ions and each provide a collection space for the reacted oxide B, the electrolyte chambers 4 each being formed with a second frame body of insulating material, and the second frame bodies being made of a hard body or an elastic body of flexible material sealed by means of ultrasonic welding, laser welding, adhesive coating or compressing so as to avoid leakage of the electrolyte C. Those skilled in the art may realize but not be limited to this technique. The electrolyte chambers 4 each have the top end portion or one end surface thereof constructed for allowing aqueous or non-aqueous electrolyte C to pass and each have at least one communicating renewal opening 41 disposed at the top end or one end surface thereof, and the electrolyte chambers 4 each have the bottom end or one end surface portion thereof constructed to have a cycle drain 42 for cyclically draining the electrolyte C and for draining the oxide B.

The gas diffusion electrodes 5 each are formed to be fixed over a second frame 51 with a gas inlet 52 and a gas outlet 53, and each have at least one side surface thereof with a plurality of gas flow channels 54 formed for the oxidizing agent incoming and outgoing and catalyzed and a plurality of diffusion regions formed between the gas flow channels 54, the gas flow channels 54 being disposed at a predetermined distance or being arranged at a fixed distance from each other, and the gas flow channels 54 communicating with the gas inlet 52 and the gas outlet 53, wherein the gas inlet 52 and the gas outlet 53 are disposed at two diagonally non-adjacent vertices of the second frame 51, respectively, so that the oxidizing agent may flow at equal distances when flowing from the gas inlet 52 through any one gas flow channel 54 to the gas outlet 53 and therefore the oxidizing agent may have a uniform diffusion area. Since the oxidizing agent, as is a fluid, flows by the nearest path, a design for managing the diffusion of the oxidizing agent is necessary for an increase of the contact area between the oxidizing agent and the gas diffusion electrodes. The gas diffusion electrode of the present invention faces the electrolyte surface in operation. For it, conventional or unknown gas diffusion electrodes 5 may be used, which typically comprises an active member and a carbon substrate to be connected to the current collector 1 appropriately. The gas diffusion electrode 5 may be provided with a dual function; for example, it may be a porous nickel or graphite electrode, or a carbon substrate with a layer of porous nickel-hole substrate overlaying the surface thereof for running between charging and discharging. A typical as diffusion electrode with substrates is disclosed in U.S. Pat. No. 6,368,751, entitled "ELECTROCHEMICAL ELECTRODE FOR FUEL CELL". Those skilled in the art may realize but not be limited to this technique.

As shown in FIG. 6, the gas diffusion electrode 5 facing the electrolyte surface in operation need not be overlaid by an insulating membrane 56, which may be used for avoiding malfunction of the replenishment system and short circuit by a direct contact as a result of accumulation of the oxide B on the gas diffusion electrode 5 along with continuously discharging throughout to a maintenance station or becoming immovable to decrease the efficiency. Moreover, small-scale 3C electronic products or electrical bicycles, designed without an automatic cycle replenishment system but adopting replenishment done by hand, also require at least one layer of insulating membrane 56 for avoiding short circuit. The insulating membrane 56 may be made from plastics, fiberglass fabrics of minerals, non-woven fabric, expanded film, solid electrolyte membrane, solid ion membrane, ion membrane or polymer membrane, all being useful. Those skilled in the art may realize but not be limited to this technique.

Figure 7:
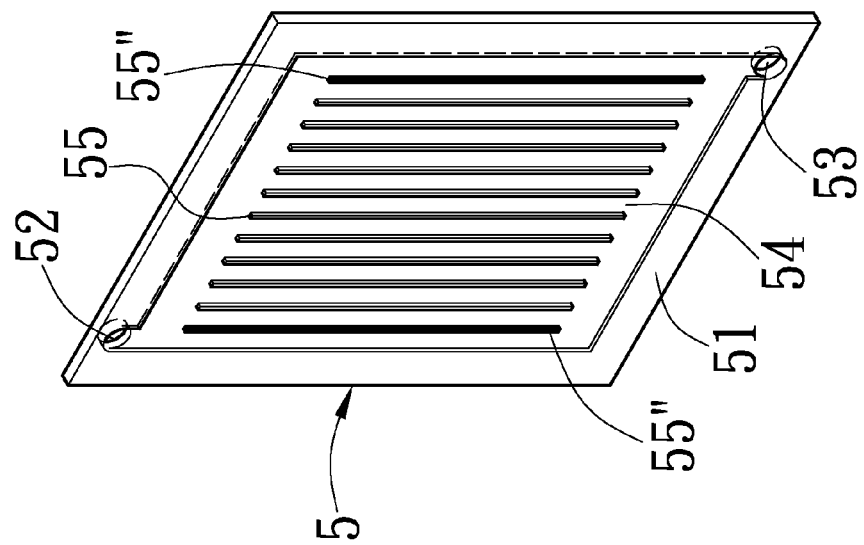
FIG. 7 is a schematic diagram of a gas diffusion electrode with conducting posts spaced a distance apart to form gas flow channels.
Figure 8:
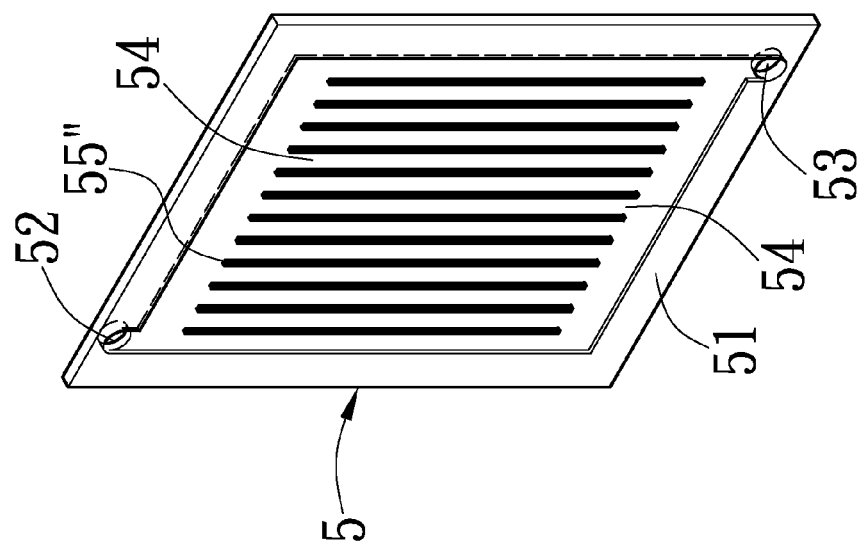
FIG. 8 is a schematic diagram of a gas diffusion electrode with posts and conducting posts spaced a distance apart to form gas flow channels.

FIGS. 7 and 8 show a schematic diagram of another embodiment of the present invention, wherein the gas flow channels 54 may be alternatively formed with posts 55 (or conducting posts 55") spaced a distance apart, the posts 55 (or the conducting posts 55") being either single or multiple, being either conductive or nonconductive but one post 55 thereof made of conducting material for saving outer wire connection, and being provided with the function of wind flow management for the oxidizing agent, the gas flow channels 54 being designed to have equal widths, equal depths and distances so that the oxidizing agent can be distributed over the gas diffusion electrodes 5 more uniformly to promote the efficiency of using the gas diffusion electrodes 5.

The member of gas diffusion electrode 5 of the present invention, as further shown in FIGS. 5 and 6, has the gas inlet 52 and the gas outlet 53 disposed at two diagonally non-adjacent vertices thereof, respectively, so that the oxidizing agent may flow at equal distances when flowing from the gas inlet 52 through any one gas flow channel 54 to the gas outlet 53 and the gas flow channels 54 may be overlaid by an insulating membrane 56 on the opposite face thereof for avoiding short circuit, the insulating membrane 56 being made from plastics, fiberglass paper, fabrics, non-woven fabric, expanded film. Those skilled in the art may realize but not be limited to this technique.

Figure 9:
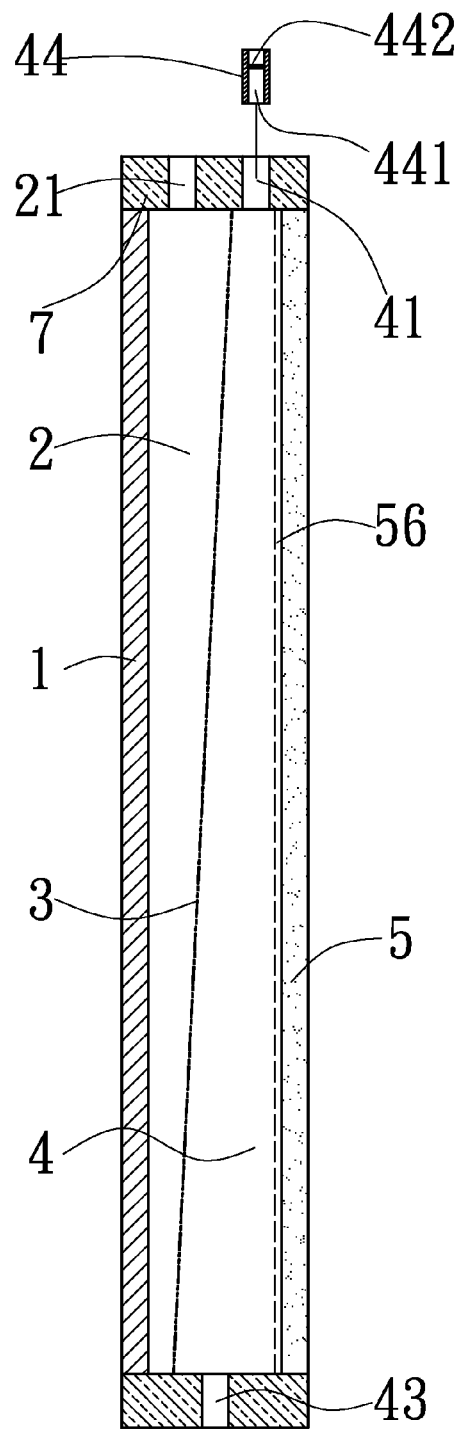
FIG. 9 is a sectional combination schematic diagram of a powdered fuel cell for replenishment done by hand according to the present invention.
Figure 10:
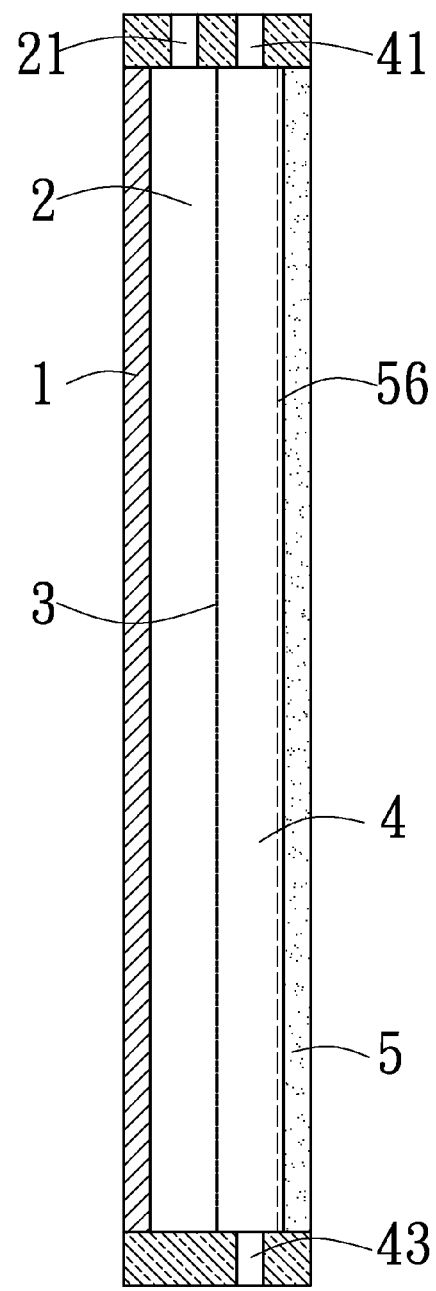
FIG. 10 is a sectional combination schematic diagram of another embodiment of the powdered fuel cell for replenishment done by hand according to the present invention.
Figure 11:
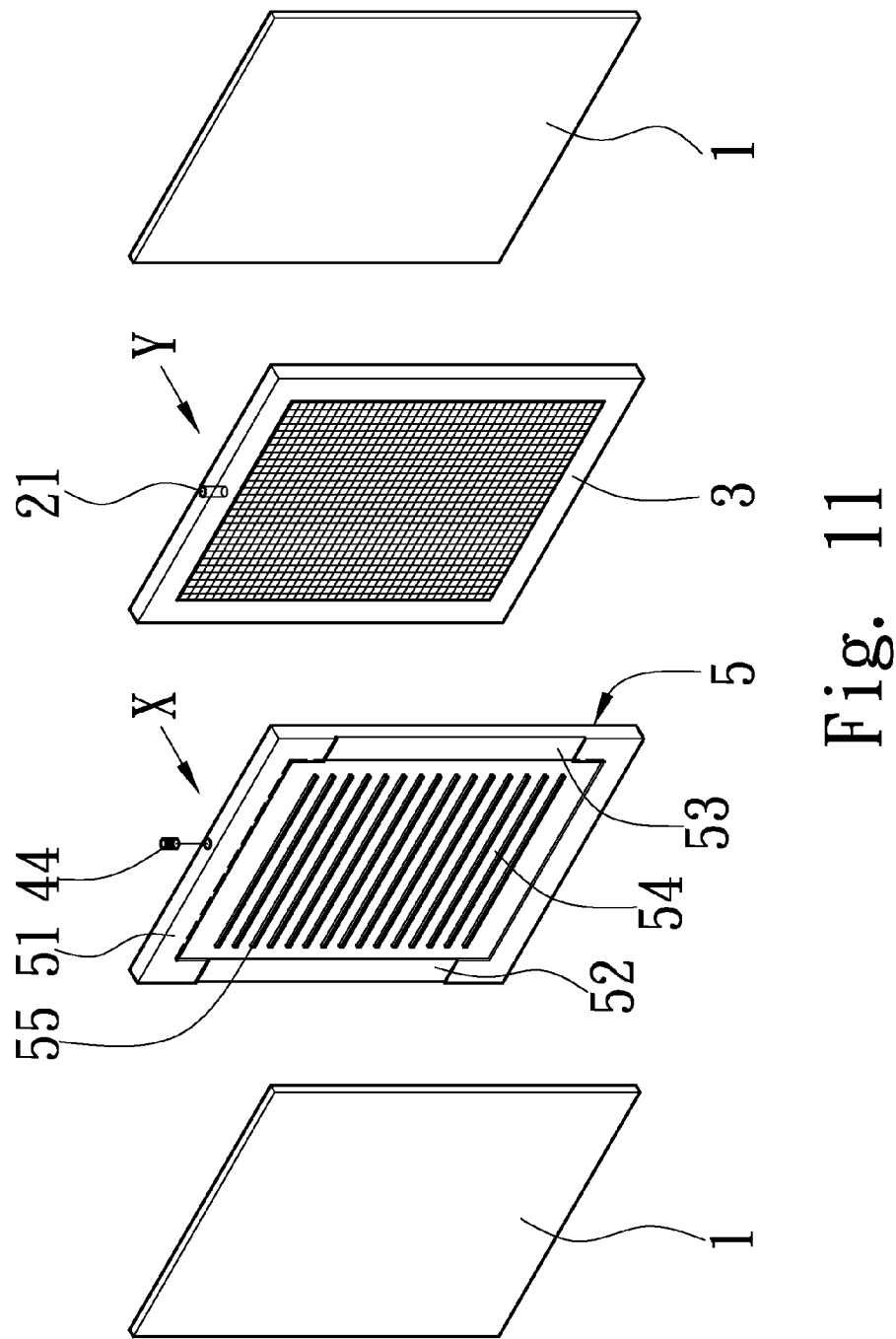
FIG. 11 is a sectional combination schematic diagram of a further embodiment of the powdered fuel cell for replenishment done by hand according to the present invention.
Figure 12:
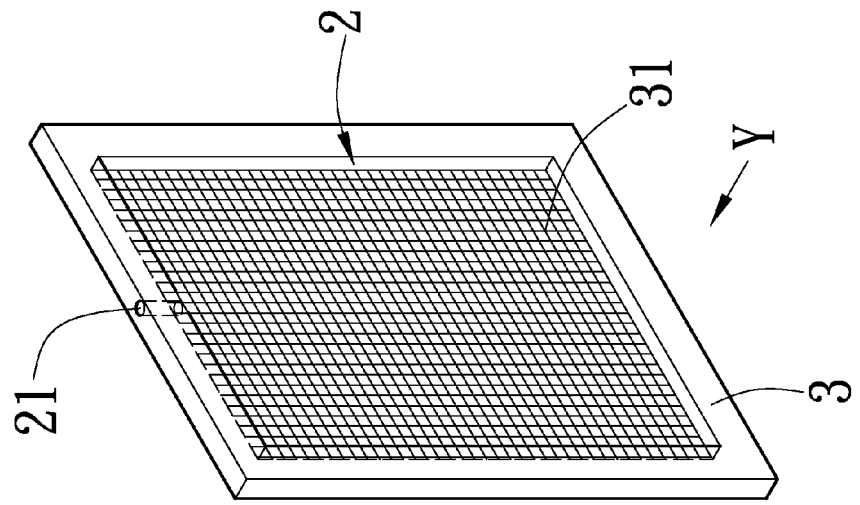
FIG. 12 is a schematic diagram viewed from the other side (opposite) of a gas diffusion electrode of the powdered fuel cell for replenishment done by hand.
Figure 13:
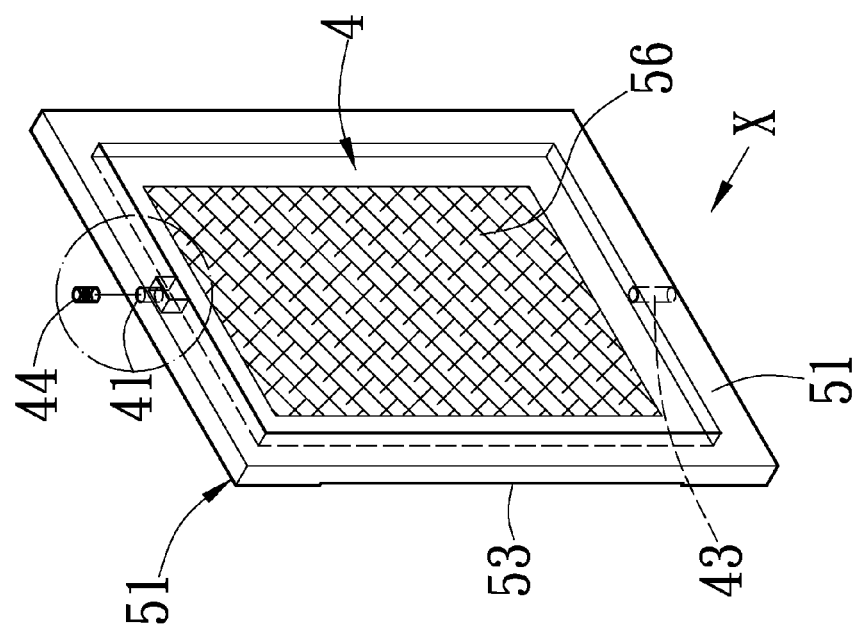
FIG. 13 is a schematic diagram viewed from the other side (opposite) of a porous membrane of the powdered fuel cell for replenishment done by hand.
Figure 14:
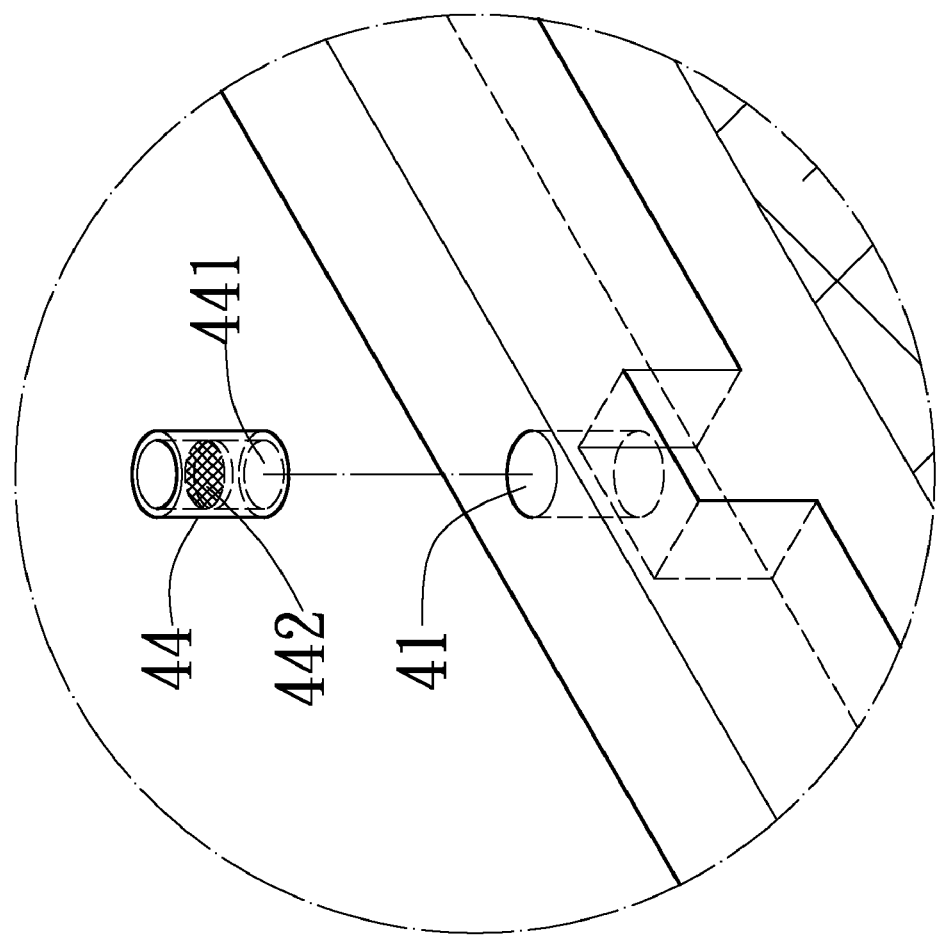
FIG. 14 is an expanded schematic diagram of an exhaust device of the powdered fuel cell for replenishment done by hand.

Further refer to FIGS. 9 and 10, which shows a schematic diagram of a further embodiment of the powdered fuel cell for replenishment done by hand according to the present invention, each of the fuel cells of the powdered fuel cell system comprising: a current collector 1; a fuel chamber 2, formed with a frame body 7 of insulating material and having an opening 21 disposed in the frame body 7; a porous membrane 3; an electrolyte chamber 4, formed with the frame body 7 of insulating material and having a renewal opening 41, a drain 43 and an exhaust device 44 disposed in the frame body 7, the exhaust device 44 having a vent hole 441 penetrating therein, and the vent hole 441 having a vent filter 442 disposed therein, the vent filter 442 being made of an air-permeable and hydrophobic while water-impermeable expanded film or nanometer-scale non-woven fabric air-permeable film; and a gas diffusion electrodes 5.

The powdered fuel cell for replenishment done by hand shown in FIG. 11 to 14, is different from that described above in that the gas diffusion electrodes 5 is formed in a second frame 51, the gas diffusion electrodes 5 having a plurality of gas flow channels 54 formed on at least one side surface thereof for an oxidizing incoming and outgoing and oxidized, the second frame 51 having a gas inlet 52 and a gas outlet 53 formed therein on the side surface, and the gas flow channels 54 being overlaid by an insulating membrane 56 on the opposite face thereof.

Figure 15:
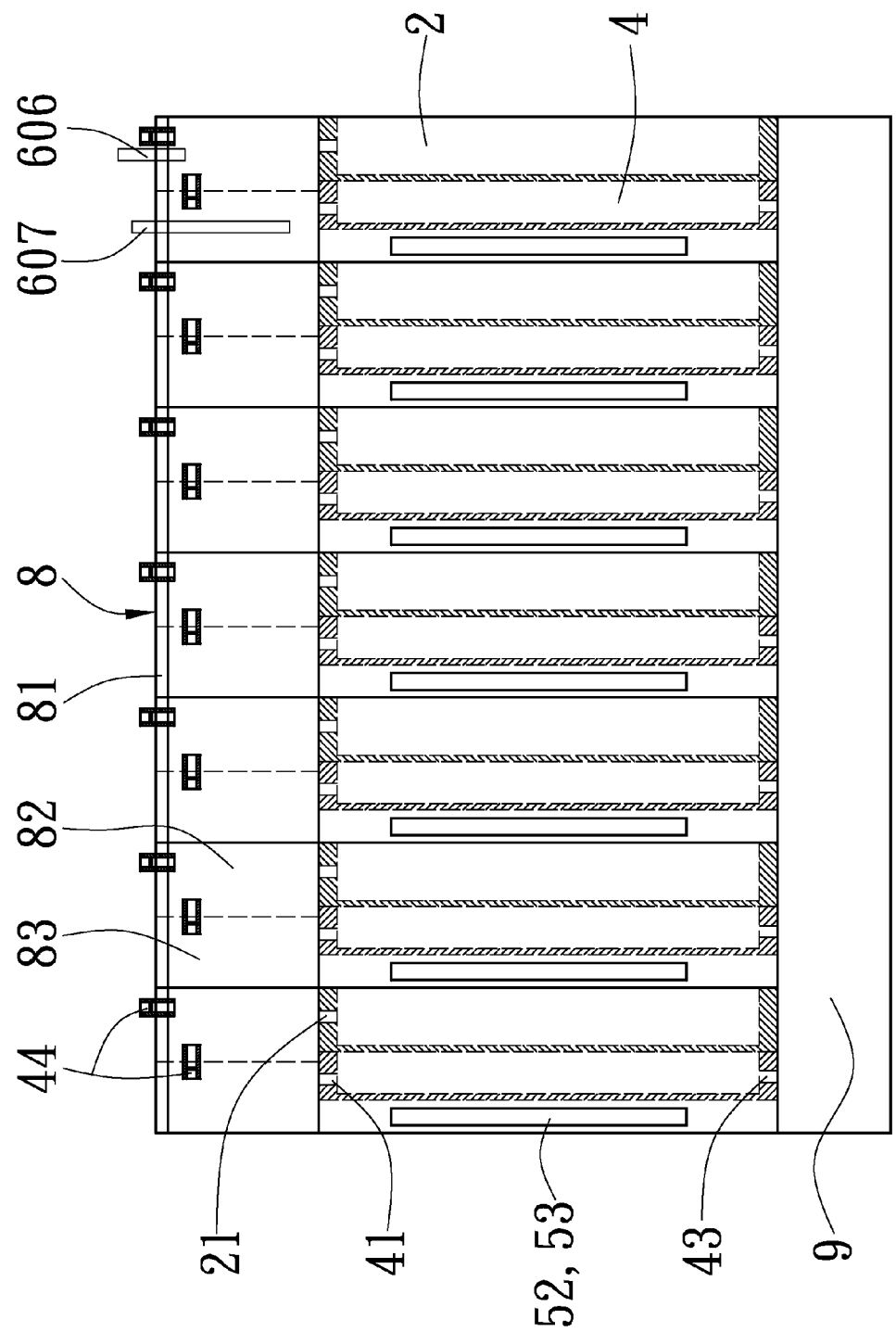
FIG. 15 is a sectional schematic diagram of a powdered fuel cell for replenishment done by hand that consists of a plurality of fuel cells.

Refer to FIG. 15, which shows a combination of a plurality of powdered fuel cells for replenishment done by hand. The powdered fuel cells are shown to each have a gas inlet 52 or a gas outlet 53 formed on the side thereof, and the powdered fuel cells may each have additionally a replenishment box 8 disposed on the top end thereof for each of the fuel cells, the replenishment box 8 having a liftable upper cover 81, a fuel renewal region 82 and an electrolyte overflow buffer region 83, the fuel renewal region 82 being provided for renewing powdered fuel A, or alternatively the powdered fuel A renewed to replenish the fuel chamber 2 via the opening 21 of the fuel chamber 2; the electrolyte overflow buffer region 83 is disposed at the upper end of an electrolyte chamber 4, the electrolyte chamber 4 has at least one renewal opening 41 disposed at the top end thereof in communication with the electrolyte overflow buffer region 83, the electrolyte overflow buffer region 83 having an exhaust device 44 disposed therein or on the boundary with the fuel renewal region 82, and the electrolyte chamber 4 has the bottom end portion thereof constructed to have a cycle drain 43 for draining electrolyte C and oxide B; the powdered fuel cells may have additionally a common collection box 9 for the electrolyte C and the oxide B disposed on the bottom end thereof for each of the fuel cells, the collection box 9 being constructed to be removable for recycling the electrolyte C and the oxide B, and a fuel sensing detector 606 and an electrolyte sensing detector 607 may be added for determining the renewal of the powdered fuel A and the electrolyte C.

Figure 16:
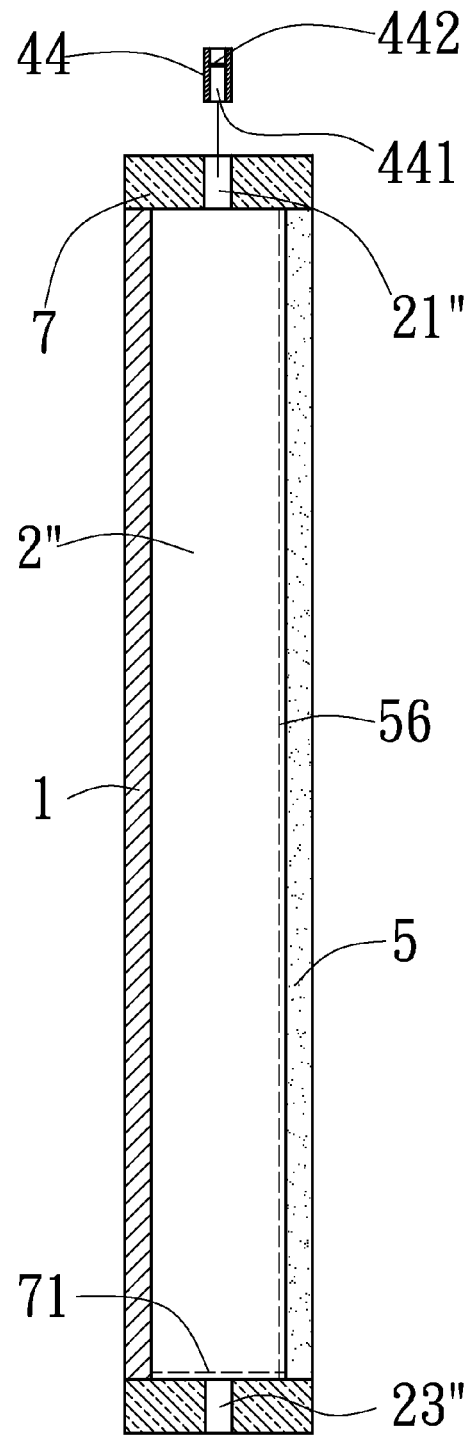
FIG. 16 is a schematic diagram of a powdered fuel cell for replenishment done by hand in a still further embodiment of the present invention.
Figure 17:
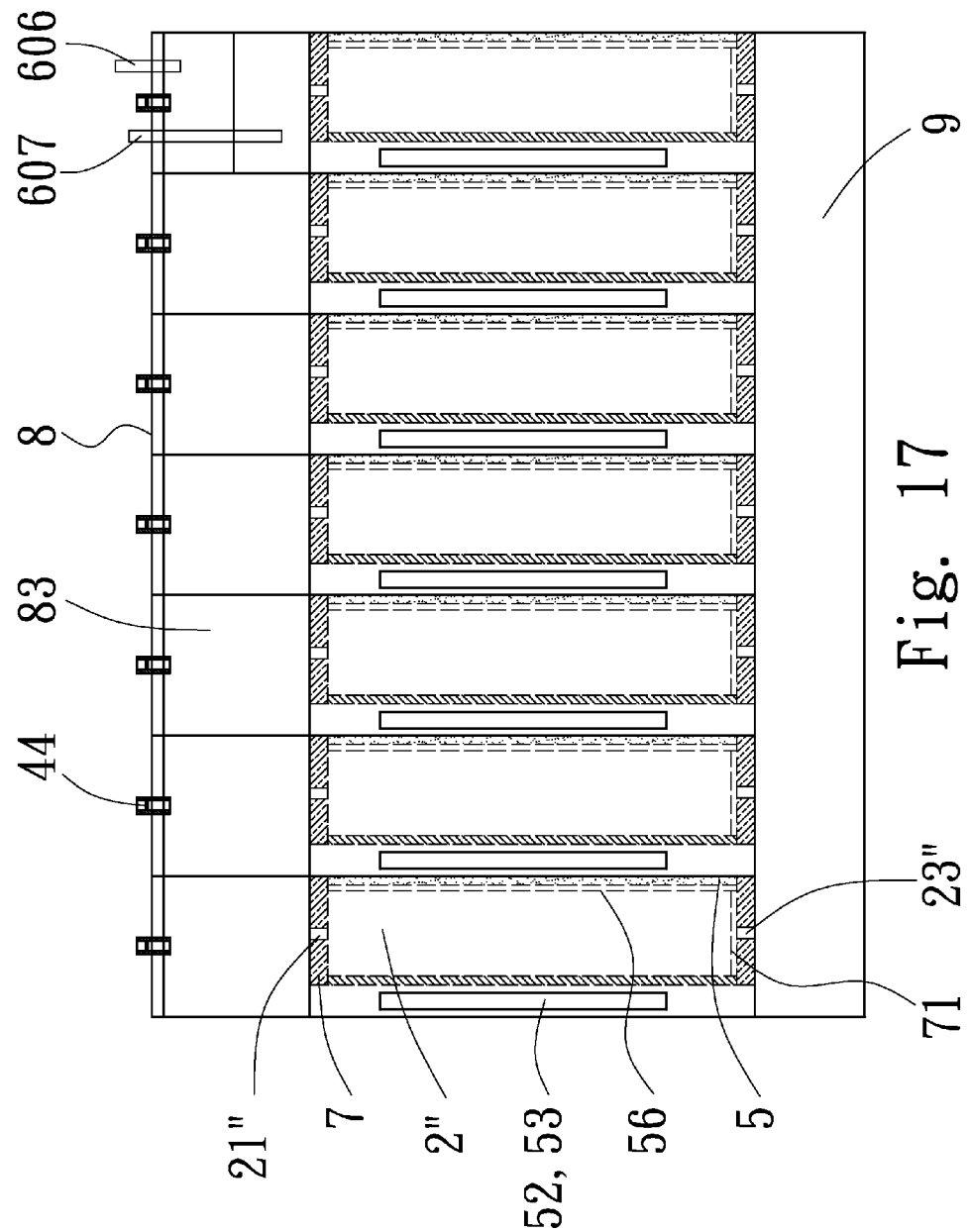
FIG. 17 is a sectional schematic diagram of a consisting of a plurality of powdered fuel cells that applies a still further embodiment of the present invention.

Further refer to FIG. 16, which shows a schematic diagram of a further embodiment of the powdered fuel cell for replenishment done by hand according to the present invention, each of the fuel cells of the powdered fuel cell system comprising: a current collector 1; a fuel/electrolyte chamber 2", providing a storage space for the mixture of powdered fuel A and electrolyte C, and having a renewal opening 21", a drain 23" and an exhaust device 44 disposed, the exhaust device 44 having a vent hole 441 penetrating therein, and the vent hole 441 having a vent filter 442 disposed therein, the vent filter 442 being made of an air-permeable and hydrophobic but water-impermeable expanded film or nanometer-scale non-woven fabric air-permeable film; a gas diffusion electrodes 5, overlaid by an insulating membrane 56 for avoiding short circuit; and a frame body 7, overlaid by a porous membrane 71, the porous membrane 71 passing oxide B therethrough so as for the oxide B to be stored in the collection box 9. Refer to FIG. 17. This powdered fuel cell may be designed to have similar function as those in FIG. 15 and the following FIG. 22, wherein the powdered fuel cell may have additionally a replenishment box 8 and an electrolyte overflow buffer region 83 disposed on the top end thereof and a collection box 9 disposed at the bottom end thereof for each of the fuel cells for renewing and recycling the powdered fuel A and the oxide B, respectively.

Figure 18:
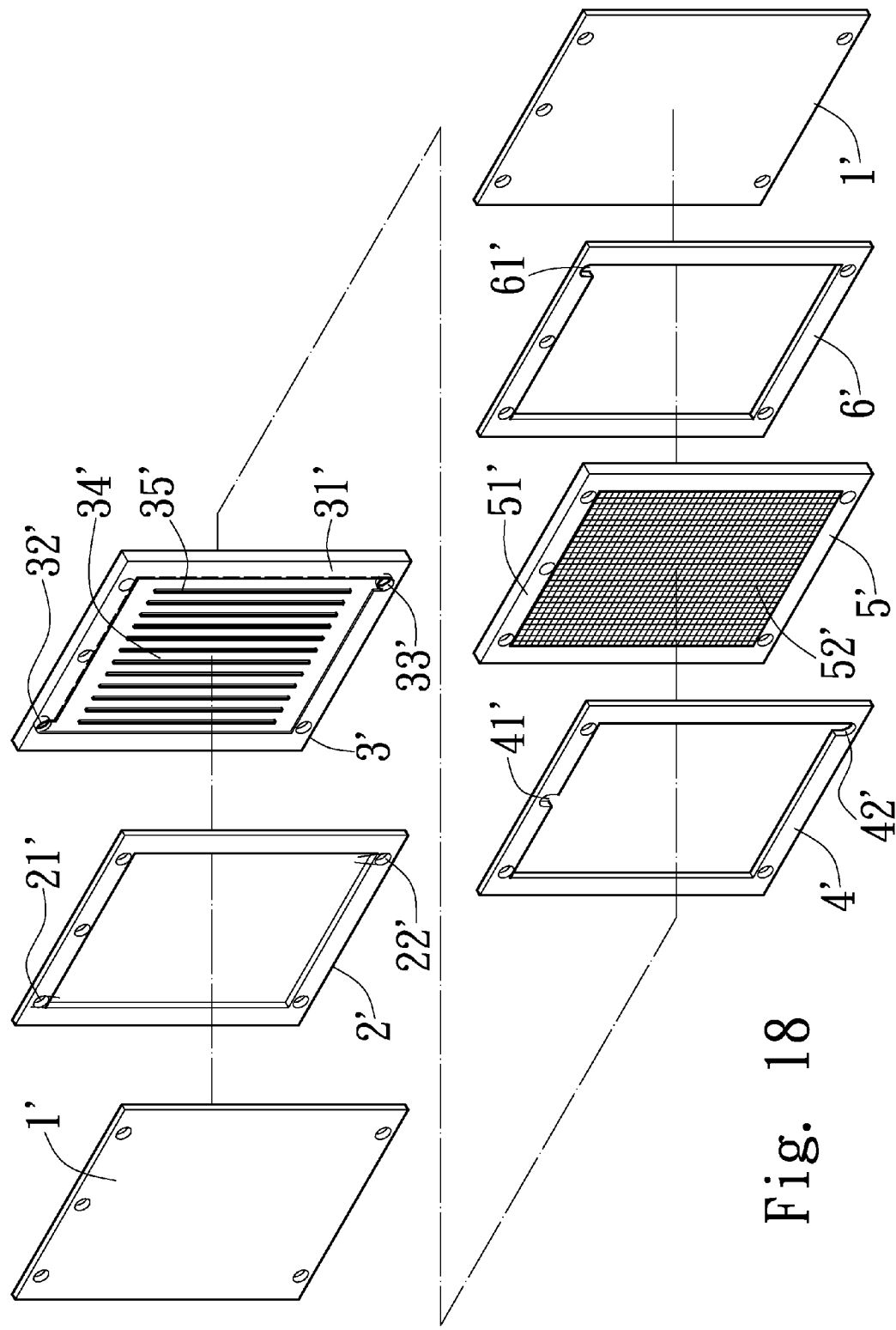
FIG. 18 is an exploded schematic diagram of a powdered fuel cell in a still further embodiment of the present invention.
Figure 19:
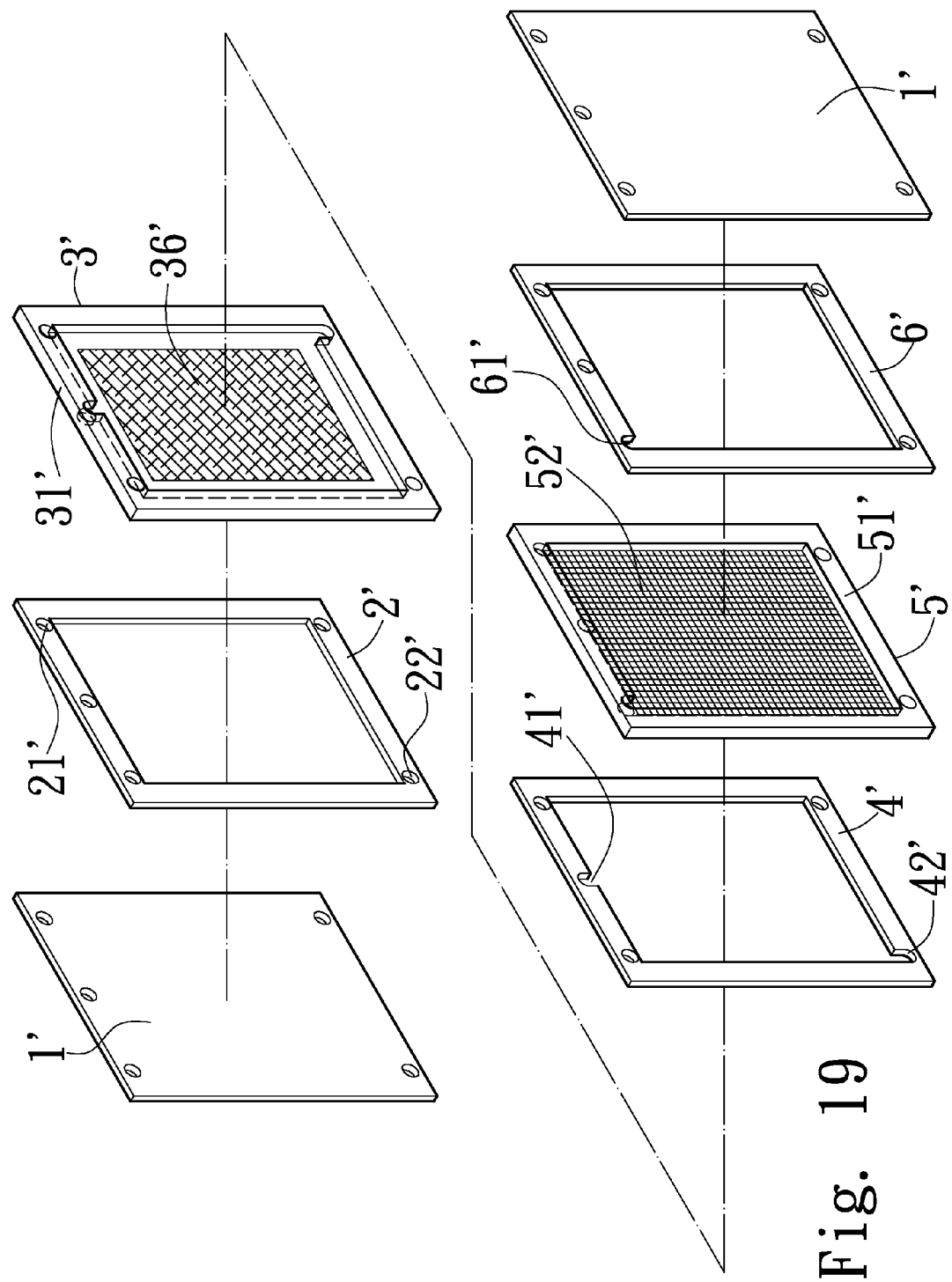
FIG. 19 an exploded schematic diagram viewed from the other side (opposite) of the powdered fuel cell in FIG. 18.

FIGS. 18 and 19 show a schematic diagram of a still further embodiment of the present invention, wherein each of the fuel cells comprises: a current collector 1'; a first frame body 2', having a gas inlet 21' and a gas outlet 22' disposed therein; a gas diffusion electrode 3', fixed over a first frame body 31', and having a plurality of gas flow channels 34', the gas flow channels 34' communicating with a gas inlet 32' and a gas outlet 33'; a second frame body 4', having a renewal opening 41' and a cycle drain 42' disposed therein; a porous membrane 5', fixed over a second frame body 51'; and a third frame body 6', having an opening 61' disposed therein. The system according to the present invention has the units thereof each consisting of the current collector 1', the first frame body 2', the gas diffusion electrode 3', the second frame body 4', the porous membrane 5' and the third frame body 6'. The fuel cell system may be formed of the units in series.

The current collector 1', the first frame body 2', the gas diffusion electrode 3', the second frame body 4', the porous membrane 5' and the third frame body 6', and another one current collector 1' may be combined in turn, wherein the flake-like or flat first frame body 2', second frame body 4' and third frame body 6' each make certain spaces between the current collector 1', the gas diffusion electrode 3', the porous membrane 5' and the other one current collector 1', for the gas flow channels 34', an electrolyte chamber and a powdered fuel chamber, respectively. The renewal opening 41' for the electrolyte chamber is constructed for passing electrolyte C therethrough. The cycle drain 42' at the bottom end of the electrolyte chamber is constructed for cyclically draining the electrolyte C and for draining oxide B. The opening 61' disposed at the top end of the powdered fuel chamber is constructed to be a replenishment channel for passing powdered fuel A.

Figure 20:
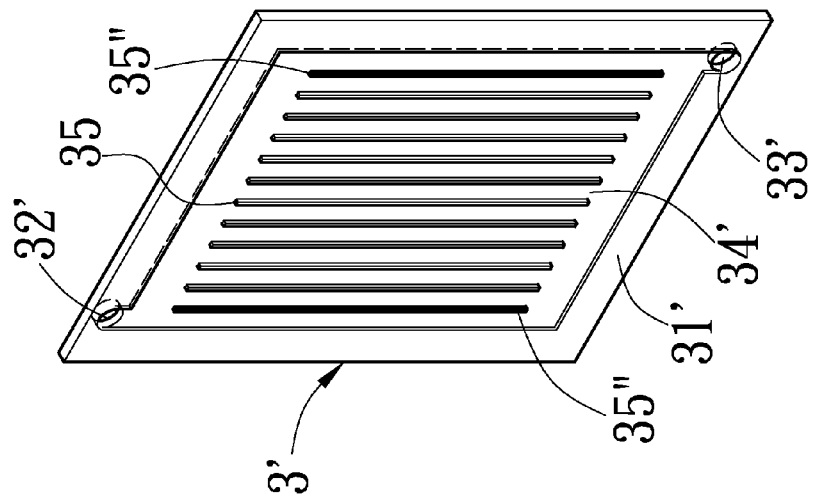
FIG. 20 is a schematic diagram of the gas diffusion electrode in FIG. 18 with conducting posts spaced a distance apart to form gas flow channels.
Figure 21:
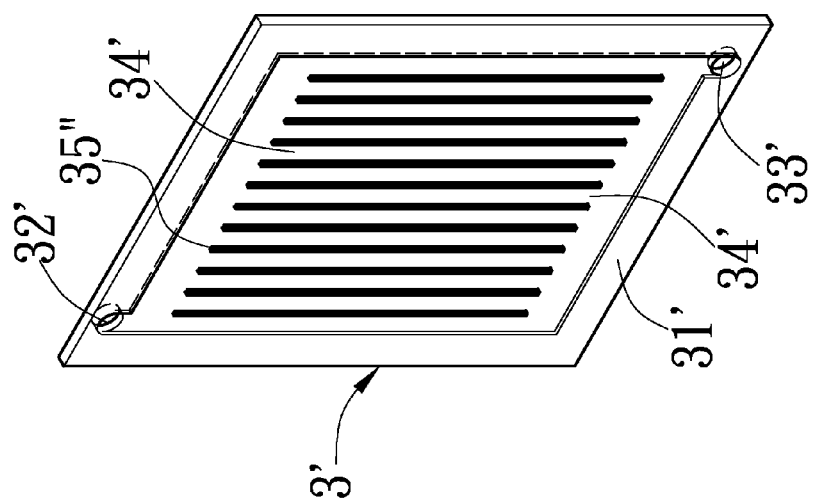
FIG. 21 is a schematic diagram of the gas diffusion electrode in FIG. 18 with posts and conducting posts spaced a distance apart to form gas flow channels.

Furthermore, the current collector 1' has posts 35' (or conducting posts 35") disposed on the side surface thereof that faces the gas diffusion electrode 3', the posts 35' (or the conducting posts 35") contacting the gas diffusion electrode 3' tightly to form one piece or, alternatively, the posts 35' may form one piece of a single conductor with the current collector 1', saving outer wires and being connected directly to the anode and the cathode as a loop. The gas flow channels 34' are formed in the spaces between any two adjacent posts 35', the gas flow channels 34' communicate with the gas inlet 32' and the gas outlet 33'. The gas diffusion electrode 3', as shown in FIG. 18, has the gas flow channels 34' formed and spaced by a distance, the gas flow channels 34' communicating with the gas inlet 32' and the gas outlet 33'. As for another embodiment in FIG. 19, the gas diffusion electrode 3' may be overlaid by an insulating membrane 36' on the gas flow channels 34' of the opposite surface thereof for avoid short circuit. As for another embodiment in FIGS. 20 and 21, the gas flow channels 34' may be alternatively formed with posts 35' (or conducting posts 35") spaced a distance apart, the posts 35' (or the conducting posts 35") being either single or multiple, being either conductive or nonconductive but one post 35' thereof made of conducting material.

The electrolyte chamber is formed between the gas diffusion electrode 3' and the porous membrane 5' with the second frame body 4', for storing the electrolyte C and collecting the oxide B, the renewal opening 41' being disposed in the second frame body 4' for placing the electrolyte C, and the cycle drain 42' for cyclically draining the electrolyte C and for draining oxide B.

The powdered fuel chamber is formed between the porous membrane 5' and the other one current collector 1' with the third frame body 6' for storing the fuel, wherein the opening 61' in the third frame body 6' is used for the renewal inlet for the powdered fuel A.

The porous membrane 5' may be made singly. Alternatively, the membrane 52' of the second frame 51' may be overlaid directly on the insulating second frame body 4' and then, optionally, compressed, sintered or bound together with the third frame body 6'. Alternatively, the membrane 52' may be cast molded or one-piece compression/injection molded. Those skilled in the art may realize but not be limited to this technique.

Figure 22:
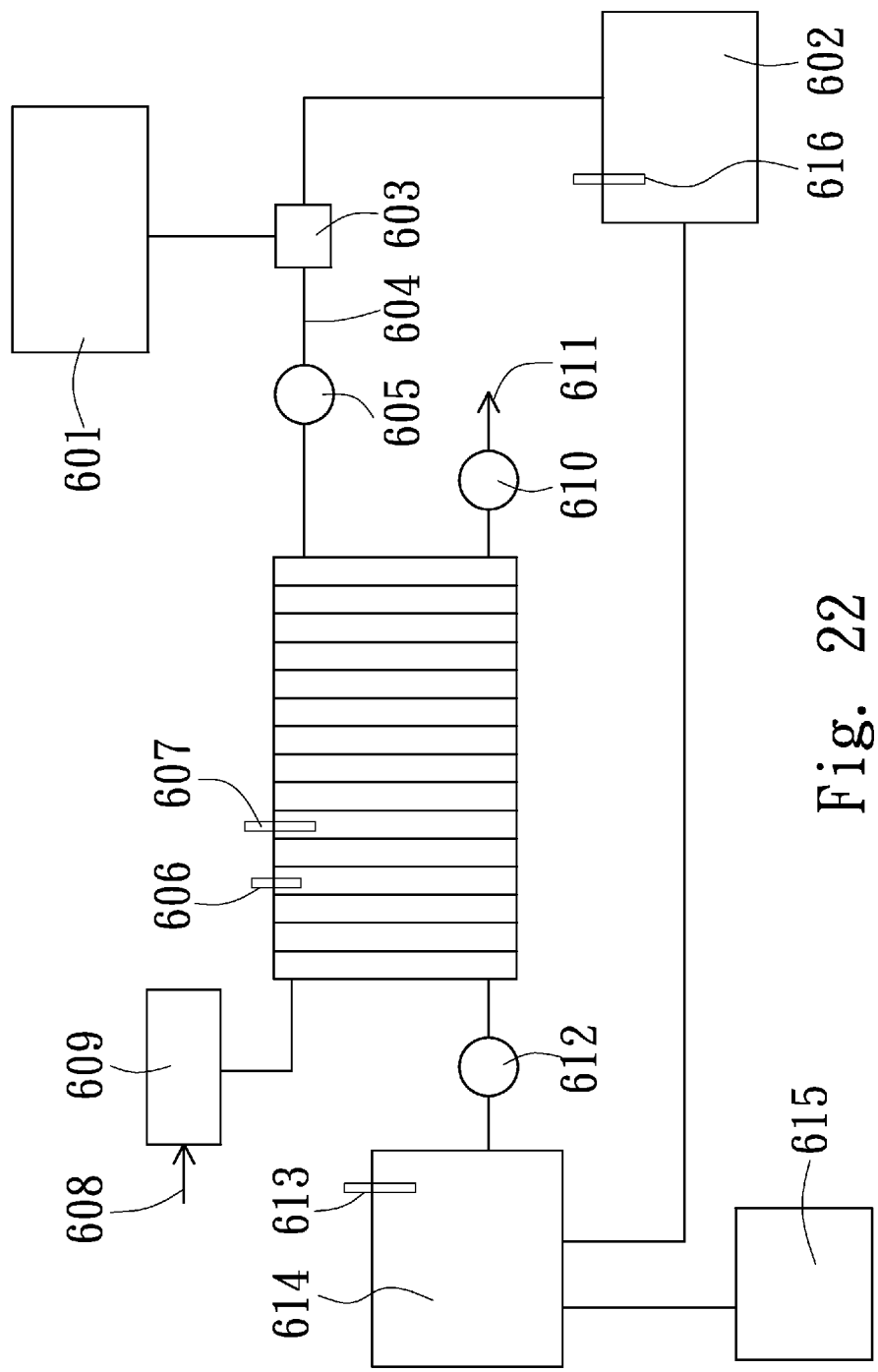
FIG. 22 is a schematic diagram of a replenishment cycle system of the powdered fuel cells of the present invention.

FIG. 22 is a schematic diagram of a replenishment cycle system of the powdered fuel cells of the present invention. The fuel cell of the present invention follows an electricity generation formula similar to that for the above-mentioned metal-air fuel cell. Accordingly, the powdered fuel A in a metal powdered fuel tank 601 and the electrolyte C in an electrolyte storage tank 602 may be renewed by a pump 605 individually, under the control of a mixer 603, through a mix tube 604 to the powdered fuel chamber 2 and the electrolyte chamber 4. The powdered fuel may be fed through a coil, which is a well-known technique. For the convenience of transporting and feeding the powdered fuel A, the powdered fuel A may be put into deionized water (pure water) or non-ionic surfactant, e.g., phosphates or poly-acrylates, to have the powdered fuel A in liquid state or colloid state for being renewed and fed. This is a well-known technique. Wherein, the renewal of the powdered fuel A and the electrolyte C may be determined by a fuel sensing detector 606 and an electrolyte sensing detector 607, respectively. During the action of the cell, air from an air inlet 608 flows through an air filter 609 to the gas flow channels 54 of the gas diffusion electrode 5, wherein oxygen in air may decompose while the electrode metal proceeds to be oxidized, resulting in a dissolution reaction as the reaction of the cell, the air outgoing from the gas flow channels 54 may be drained out via an air outlet 611 with a blower 610, and the dissolved oxide B passing the holes of the porous membrane 3 together with the electrolyte C may be drained out of the cell via the cycle drain 42 at the bottom end of the electrolyte chamber 4. Thus, the powdered fuel A may be supplied to the current collector 1 continuously to achieve discharge for a long time.

The powdered fuel cell of the present invention may act simply at normal temperature and atmosphere. The current collector 1 contact the gas diffusion electrode 3' directly by the posts 55 (or conducting posts 55") so that both electrical conduction and heat dissipation may be provided. Moreover, since the metal powdered fuel A is oxidized very easily (For conventional metal flake-air electrodes, since the oxide cannot be drained out, thin films of oxide would be easily produced and become immovable with a voltage drop generated at large current to affect the efficiency of discharge.) and the product thereof is the nanometer-scale oxide B, which tends to be dissolved in the electrolyte C and may be drained out with the electrolyte C, the powdered fuel A may be renewed to the powdered fuel cell so that not only discharge may be continued with no residual of powdered fuel A that has not discharged, but also high efficiency may be achieved with 1 V even for 500 mA per square centimeter.

The electrolyte has current efficiency more than 98% and total efficiency more than 60%, whereas the hydrogen fuel cell made of the same material has only a voltage of 0.4 V for the current 500 mA per square centimeter. The reason for this significant higher efficiency lies in that the present invention is free from the over-voltage loss due to the hydrogen electrode reaction, and from the impedance (affecting the current efficiency) of the ion membrane (PEM). High voltage implies allowance for reduction of the amount of electrodes, so that the cost may be lowered and the volume of the system may be decreased relatively.

One liter of gasoline has energy density of 33,000 KJ. 1 KWH=3600 KJ=9.16 KW.

Theoretically, one kilogram of hydrogen storage metal material may store energy of 320 W. One kilogram of powdered fuel A (e.g., zinc powder) has 820 A×1.645 V, which is 4 times the energy density of the hydrogen storage material. Since one kilogram of zinc powder has a specific weight of 7.14, it has energy density of 9.63 KW, which is slightly higher than gasoline.

Current chemical compounds for the liquid fuel cell have, theoretically, saturation energy density of 5.16 KWH per one liter. It may be charged to give only 70-80% energy density in practice and discharged with about 20% residual energy, so that the energy density would be reduced.

The powdered fuel cell of the present invention is free from such a shortcoming. It may have even more times the energy density if magnesium or lithium metal powder is used. The powdered fuel cell of the present invention has weight much lighter than the whole engine of the automobile. It has efficiency higher than the automobile by 2-3 times when applied to electrical vehicle and even higher by more than 4 times when applied to electrical vehicle running in urban area, so that energy saving can be achieved.

The powdered fuel A (e.g., zinc powder) may further comprises an alloy component selected from the group consisting of bismuth, calcium, magnesium, aluminum, lithium, indium, lead, mercury, gallium, tin, cadmium, germanium, antimony, selenium, thallium and a combination of at least one above component.

The fuel cell of the present invention may be replenished at a replenishment station, like a gasoline car refueling. The replenishment depends on the amount used and is fast and convenient. The metal oxide B as the only product may be recycled for electrolyzing in the replenishment station as well, where the fees for the power and the profit rather than the metal powder would be collected. In contrast, the cost for recycling and reprocessing ordinary batteries is so high that it is disadvantageous to have environmental protection.

Direct heat dissipation is possible because of a direct contact of the current collector 1 with cool air. Wet air may be introduced to promote heat dissipation and to activate the electrodes. After the oxide B and the electrolyte C are drained by a pump 612 from the cycle drain 42 at the bottom end of the electrolyte chamber 4, they are separated with a filtering separator 614. The recycled oxide B is be stored in an oxide recycle tank 615. The recycled electrolyte C is recycled to the electrolyte storage tank 602, in which a temperature sensor 616 and a fan (not shown) may be disposed in addition. The electrolyte C may be cooled before entering the cells so as to reduce the temperature of the cells optionally. The temperature sensor 616 and the fan may be disposed suitably elsewhere in the cells as well.

For replenishment, the electrolyte C flows with the (metal) powdered fuel A through the mixer into the cells, to renew the fuel. The fuel sensing detector 606 is disposed to monitor the use of the fuel in the cells, for renewal or stop. Excessive renewal would cause short circuit, whereas inadequate renewal would affect the output electricity. The electrolyte sensing detector 607 should be disposed at a altitude different from that for the fuel sensing detector 606. The cycle time of the electrolyte C may be detected with time difference of drip, so that cyclically pumping is not necessary. Furthermore, an electrolyser may be added (not shown) for reducing the oxide B directly. Therefore, the powdered fuel cell has the convenience of both the gasoline car and the battery suitably for use anywhere. Moreover, it is simple in operation and nearly needs no maintenance and supplies and, therefore, save the natural resource.

In the theory of electrochemistry, different high-efficiency electrodes can be used for charging and discharging separately, such as to provide the cell with extra duality, high efficiency and superior environmental protection to any battery. Because metal powder does not burn to be oxidized directly and it would not explode, it is suitable for long-term storage in a simple way with no special containers needed and it is still suitable for transportation, electricity storage and electricity conversion with perfect safety.

As known from the above discussion, the powdered fuel cell has commercially the advantage in every aspect of high energy density, high energy conversion efficiency, low cost, long life cycle, low effect on the environment, safety, and convenience for use and maintenance. Indeed, it is a novel and non-obvious invention, as is a commencement of substitution for fossil fuel.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A powdered fuel cell, comprising:
   a plurality of current collectors, made of conducting material for collecting conducting electrons;
   a plurality of fuel chambers, each providing a storage space for powdered fuel to carry out oxidization reaction of the cell;
   a plurality of porous membranes, for passing oxide formed from the reacted powdered fuel therethrough and blocking the unreacted powdered fuel;
   a plurality of electrolyte chambers, each providing a storage space for electrolyte and each providing a collection space for the reacted oxide, wherein the porous membrane is disposed between the fuel chamber and the electrolyte chamber; and
   a plurality of gas diffusion electrodes, for an oxidizing agent catalyzed to acquire electron and ion conduction, wherein the gas diffusion electrode is adjacent to the electrolyte chamber; and
   at least one exhaust device disposed on the electrolyte chamber, wherein the exhaust device has a vent hole and a vent filter disposed inside the vent hole.

2. The powdered fuel cell of claim 1, wherein each fuel chamber is formed with a first frame body of insulating material with the top end portion thereof constructed for allowing the powdered fuel to pass.

3. The powdered fuel cell of claim 2, wherein each fuel chamber has at least one opening disposed at the top end thereof, the at least one opening communicating with the fuel chambers.

4. The powdered fuel cell of claim 1, wherein each porous membrane has a plurality of holes formed thereon, each hole having a diameter of 3-200 μm.

5. The powdered fuel cell of claim 1, wherein each porous membrane is fixed over a first frame formed of an insulating hard body.

6. The powdered fuel cell of claim 1, wherein each electrolyte chamber is formed with a second frame body of insulating material.

7. The powdered fuel cell of claim 1, wherein each electrolyte chamber has the top end thereof constructed to have a renewal opening disposed at the top end for allowing the electrolyte to pass, and each electrolyte chamber has the bottom end thereof constructed to have a cycle drain for cyclically draining the electrolyte and for draining the oxide.

8. The powdered fuel cell of claim 1, wherein each electrolyte chamber has one end surface thereof constructed to have a renewal opening disposed at the top end for allowing the electrolyte to pass, and each electrolyte chamber has the other end surface thereof constructed to have a cycle drain for cyclically draining the electrolyte and for draining the oxide.

9. The powdered fuel cell of claim 1, wherein each gas diffusion electrode is formed to be fixed over a second frame.

10. The powdered fuel cell of claim 9, wherein a gas inlet and a gas outlet are disposed at two diagonally non-adjacent vertices of the second frame, respectively, so that the oxidizing agent may flow at equal distances when flowing from the gas inlet through any one of gas flow channels to the gas outlet.

11. The powdered fuel cell of claim 10, wherein the gas flow channels are formed with posts spaced a distance apart.

12. The powdered fuel cell of claim 10, wherein the gas flow channels are formed with conducting posts spaced a distance apart.

13. The powdered fuel cell of claim 10, wherein the gas flow channels are formed with the posts and the conducting posts.

14. The powdered fuel cell of claim 10, wherein each gas diffusion electrode has the gas flow channels thereof overlaid by an insulating membrane on the opposite face thereof for avoiding short circuit.

15. The powdered fuel cell of claim 1, wherein the current collectors further comprises the posts.

* * * * *